Figure 2:
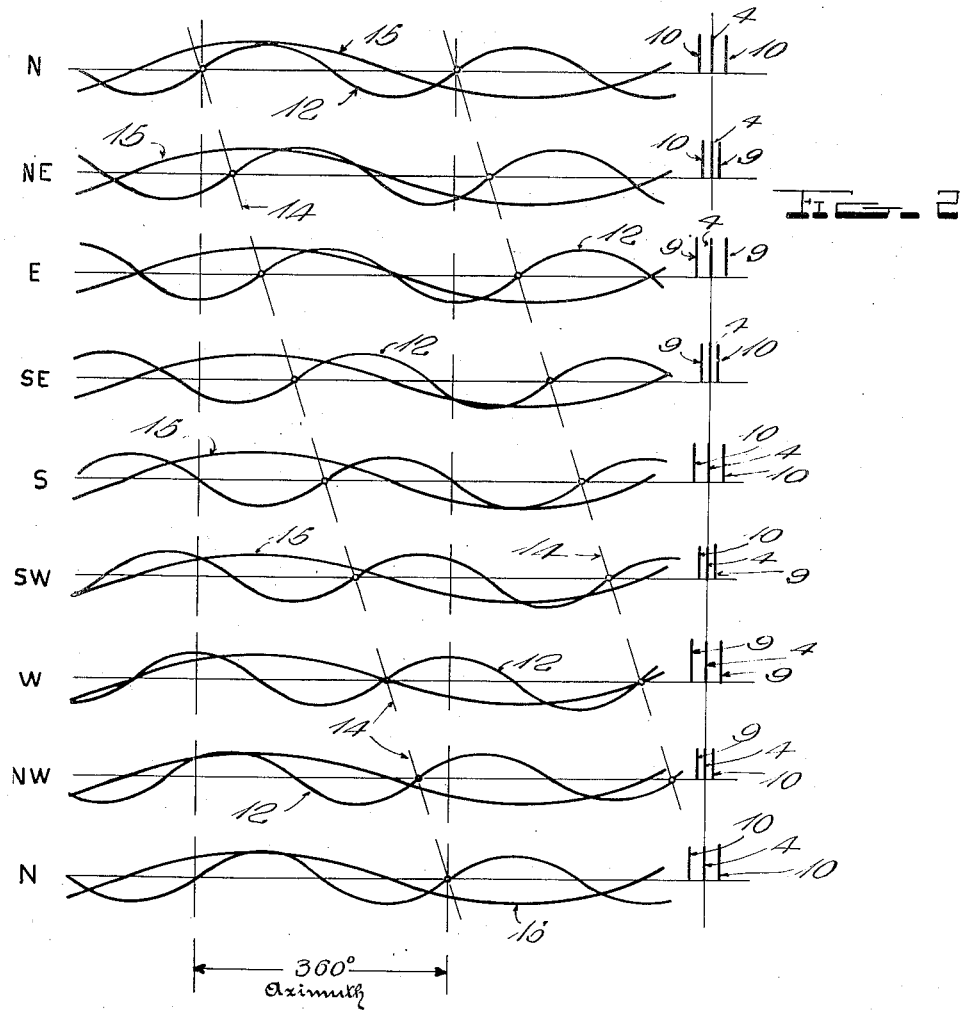

Aug. 19, 1941.  J. F. BYRNE  2,252,699
AZIMUTH RADIO BEACON SYSTEM
Filed July 30, 1938   5 Sheets-Sheet 1
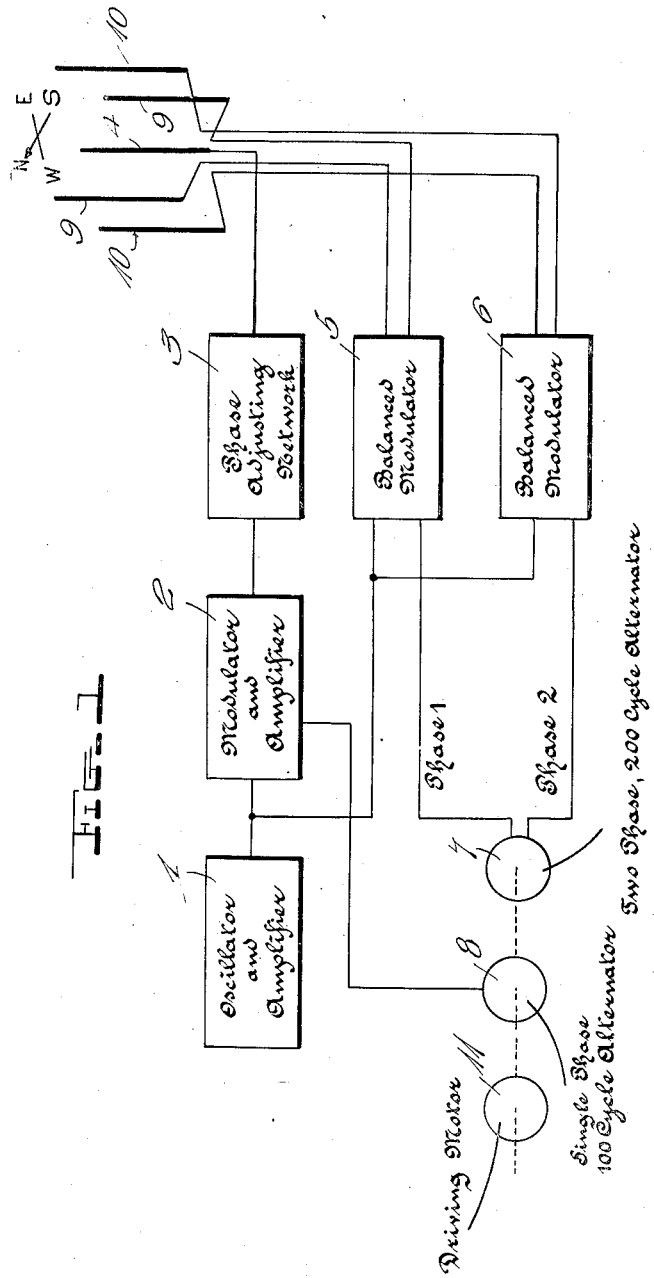
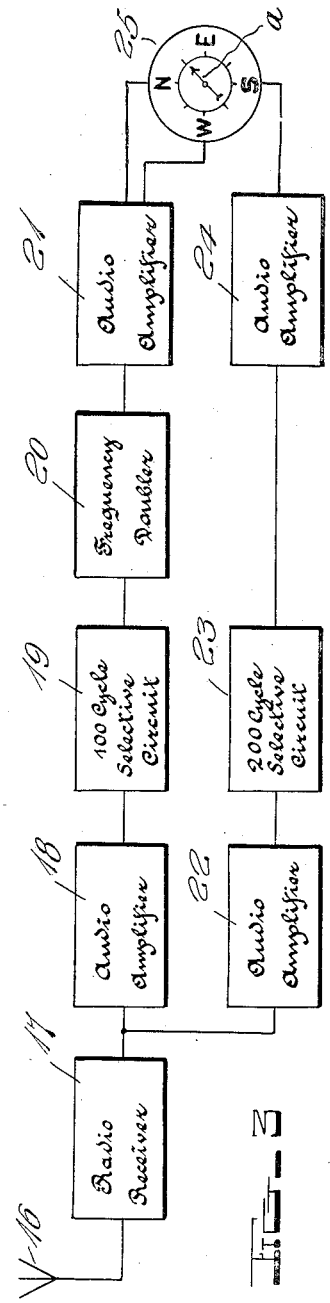
INVENTOR.
John F. Byrne,
BY John B. Brady
ATTORNEY.

Aug. 19, 1941.  J. F. BYRNE  2,252,699
AZIMUTH RADIO BEACON SYSTEM
Filed July 30, 1938  5 Sheets-Sheet 2

INVENTOR.
John F. Byrne,
BY John B. Brady
ATTORNEY

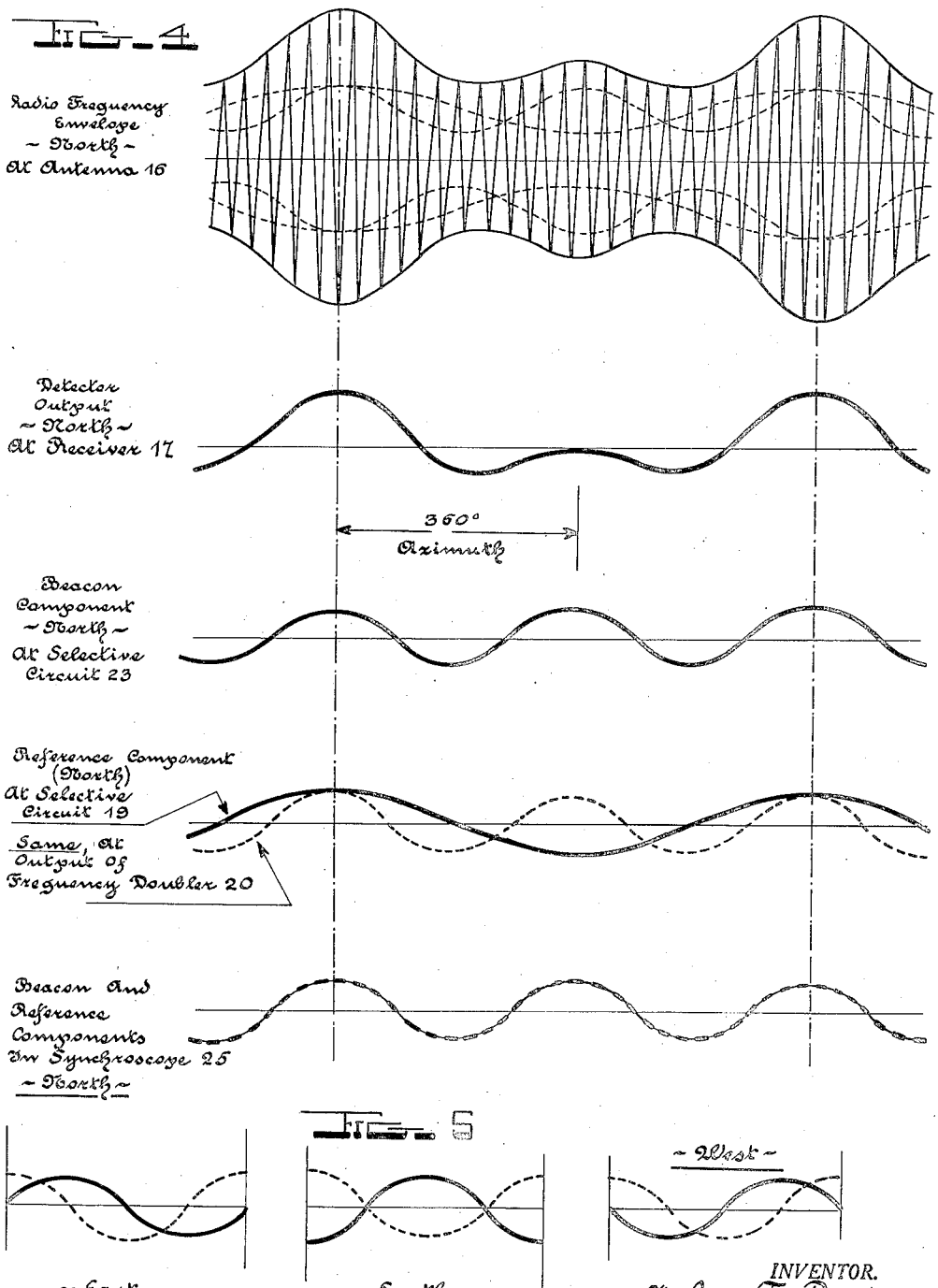

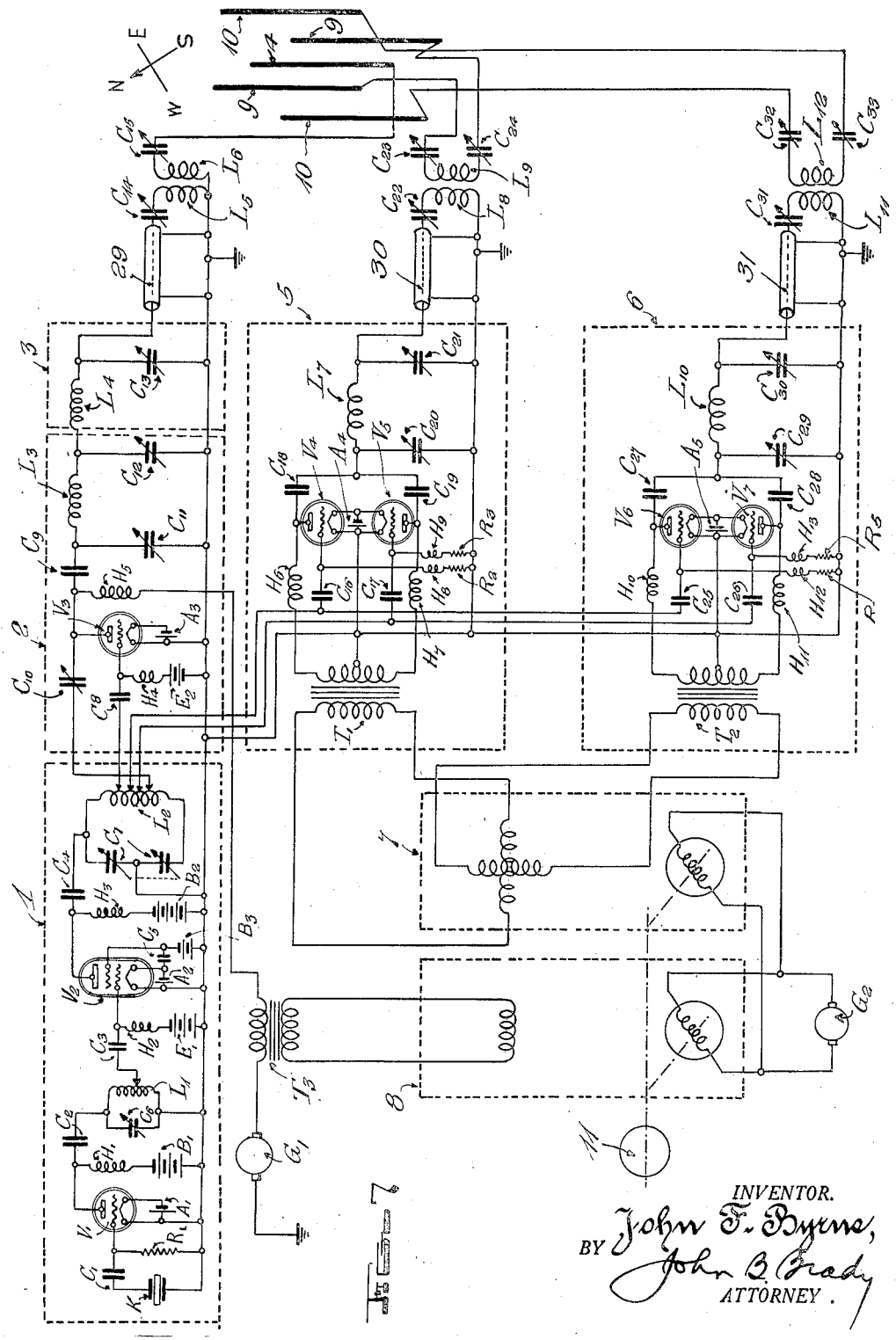

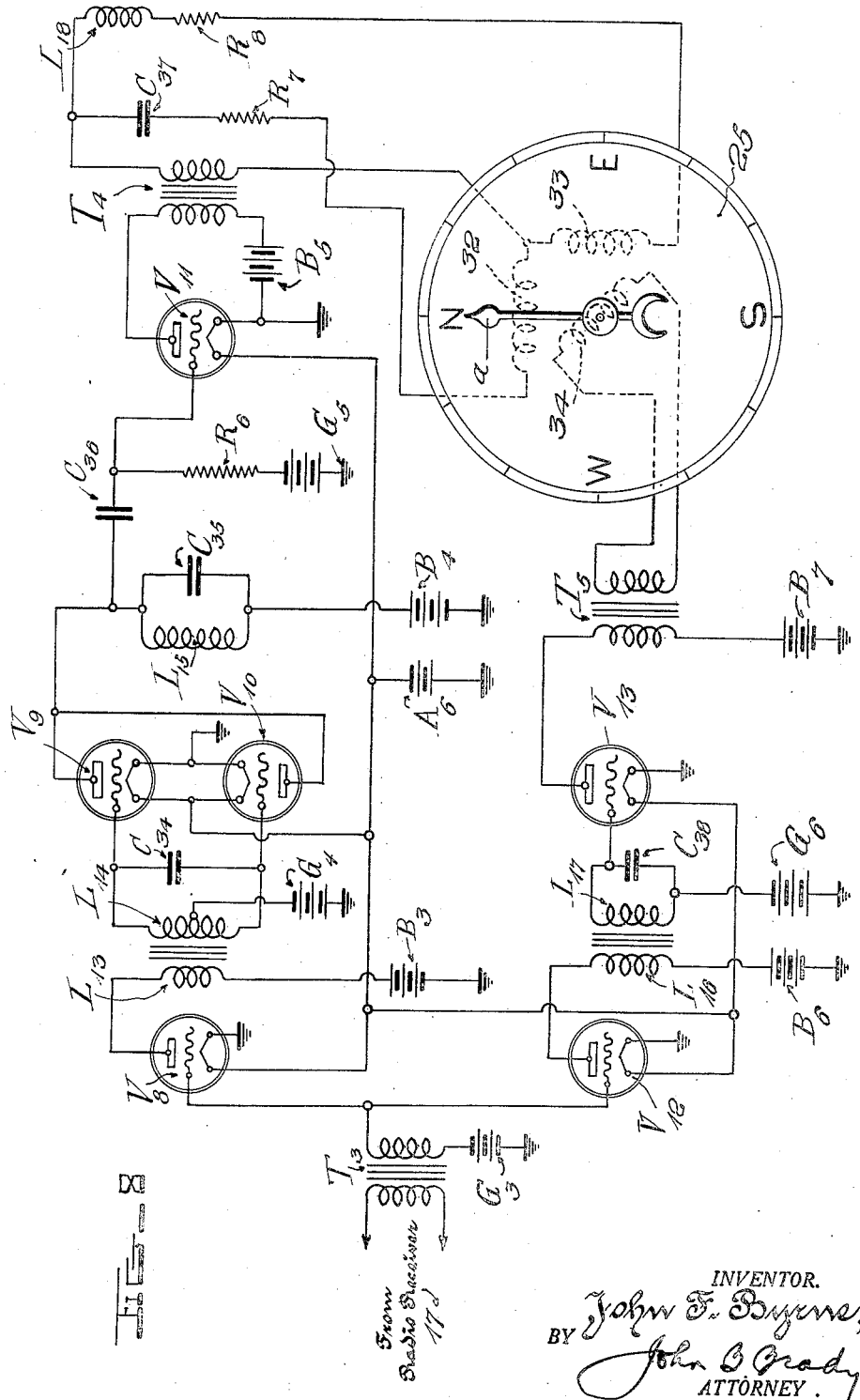

Patented Aug. 19, 1941

2,252,699

UNITED STATES PATENT OFFICE 2,252,699

AZIMUTH RADIO BEACON SYSTEM

John F. Byrne, Cedar Rapids, Iowa, assignor to Collins Radio Company, Cedar Rapids, Iowa, a corporation of Iowa Application July 30, 1938, Serial No. 222,267

7 Claims. (Cl. 250—11)

My invention relates broadly to the high frequency transmission and reception of radio beacon signals of the azimuth type, and more particularly to a system in which the radiation field is caused to rotate continuously and uniformly at high frequency and in which a continuous indication of azimuth bearing is given at the receiving point.

One object of my invention is to provide a system of transmission in which the audio frequency phase of a modulation is, at any receiving point, equal to the azimuth bearing of the transmitting station with respect to the receiving point.

Another object of my invention is the simultaneous transmission of a second modulated signal, such that the audio frequency phase thereof is the same in all directions.

Still another object of my invention is to provide means at the receiving point for indicating the phase relation between the two received modulations, thereby indicating continuously and automatically the azimuth bearings of the transmitting station at the receiving point.

A further object of my invention is to provide a radio beacon system operating independently of directional transmission or reception and employing equi-laterally broadcast wave transmission having a component varying in phase as a function of the azimuth angle at the transmitter.

A still further object of my invention is to provide a radio beacon system of broadcast transmission characteristics and employing non-directional receiving means, directional data being derived from the phase relation of independent audio frequency modulations the phase of one of which varies as a function of the azimuth angle at the transmitter.

Another object of my invention is to provide a beacon indicator system operable in connection with a conventional broadcast type radio receiver for amplitude modulated waves, in combination with the transmission system of my invention.

Still another object of my invention is to provide a compass type indicator chart with indicator means adjusted and controlled in accordance with my invention for showing the line of travel with respect to the earth, e. g., east-west, which line passes through the beacon station.

A further object of my invention is to provide dual compass type indicator means with indicators separately adjusted and controlled in accordance with my invention, one of the indicators operating to show the compass line of travel with respect to one beacon station and the other indicator operating to show the relative directional relation of another beacon station, to indicate the extent and/or direction of travel along the line indicated by the first indicator.

Figure 6:
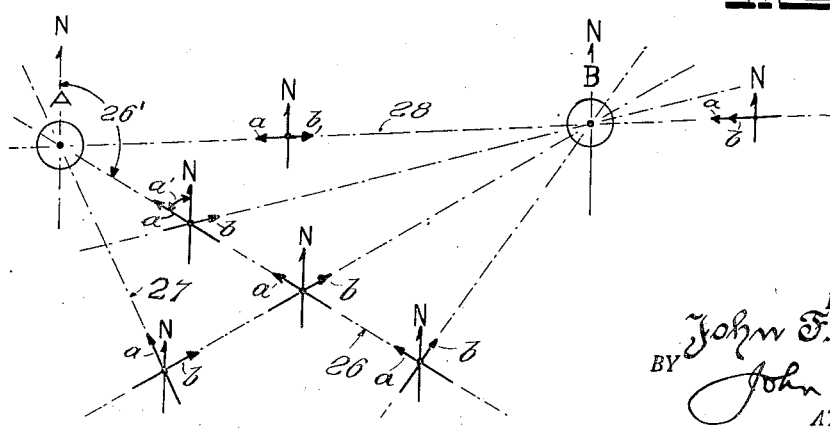

Other and further objects of my invention reside in the system and arrangements hereinafter more fully set forth with reference to the accompanying drawings, in which:

Figure 1 is a block diagram of the transmitting equipment shown in connection with the antenna arrangement employed in the system of my invention; Fig. 2 is a series of diagrams showing schematically the phase relations of component space waves in various directions with respect to the antenna system; Fig. 3 is a block diagram of the receiving equipment cooperable in the system of my invention; Fig. 4 is a series of diagrams showing schematically the derivation of the beacon and reference components from the space wave in the north direction; Fig. 5 is a series of diagrams showing schematically the phase relation of the beacon and reference components in east, south, and west directions; Fig. 6 is a ground diagram of separate beacon stations showing the operation of dual indicator means in various positions with respect thereto in accordance with the azimuth beacon system of my invention; Fig. 7 is a schematic diagram of the circuit connections in one form of transmitter of the type shown in Fig. 1; and Fig. 8 is a schematic diagram of the circuit connections in one embodiment of translating apparatus operable in connection with a radio broadcast receiver as indicated in Fig. 3.

A radio beacon system adequate for aircraft in flying either fixed airways or independent routes should have the following specifications:

1. The system shall afford the pilot information to enable him to continue along a direct course between two points, without reference to landmarks, and shall indicate the direction and extent of any deviation from the course, as well as arrival at the destination.

2. The necessary directional service shall be available at all times and under all conditions, to all airplanes equipped to receive the service and flying within the area served.

3. The service shall be easily, positively, and quickly available to the pilot with a minimum of effort on his part.

4. The radio equipment on the airplane shall be simple, rugged, lightweight and relatively inexpensive.

5. The ground equipment shall be as simple as possible and such as to conserve the limited radio channels available.

These objectives are only partially fulfilled at the present time. The federal directional range beacons are useful only to craft flying the fixed courses, and distance off course is not easily calculable. "Homing" devices now used on planes are subject to wind drift, and under adverse cross wind conditions, a spiral course results. The azimuth beacon developed in Europe has a major disadvantage in that at least 30 seconds time is required to obtain a bearing.

The system of my invention avoids these and many other disadvantages and provides a beacon system having broadcast characteristics so that directional indications are available at any point in the broadcast field, independent of directional or "homing" devices, and the data received is automatically translated into directional indications and preferably shown by pointer on a compass type dial. These features of the azimuth radio beacon system of my invention are due primarily to an adaptation of polyphase broadcast transmission of the type provided for in my copending application Serial Number 215,465, filed June 23, 1938, for Broadcasting system, wherein is disclosed a high frequency broadcasting system in which the phase of modulation of an amplitude modulated wave varies as a function of the azimuth angle from the station. My present invention provides for the additional transmission of a modulation of fixed phase as a reference for measurement of the phase of the other modulation, from which directional data is automatically derived by proper calibration of the measuring instrument.

Certain other systems of direction finding have been proposed, employing broadcast fields and non-directional receiving antenna devices, but these systems do not concern the measurement of the phase relation of two impressed modulations one of which varies in phase with the azimuth angle. Such systems depend primarily upon the frequency of revolution about the transmitter of a component of the space field as a basis for the measurement of the phase thereof with respect to a reference wave of fixed phase, measured from a known or calculable direction line. This method is more complicated in its inception and more costly in construction and maintenance than the simplified arrangement of my invention for the direct comparison of the phases of separate modulations impressed on a single radio frequency carrier at the transmitter. The previous systems base the determination of phase essentially on the measurement of a time interval, which, in connection with the known frequency of revolution of the field, establishes the position with respect to the given reference.

Referring to Fig. 1 which shows by block diagram the transmitter arrangement for propagating carrier energy and modulation energy of fixed and varying phase, reference character I indicates the high frequency oscillator and amplifier generating carrier energy which is fed to modulator-amplifier 2 and balanced modulators 5 and 6. The output of modulator 2 is fed to non-directional radiator 4 through a phase adjusting network at 3, and there is produced a broadcast field modulated in fixed phase, which is the basis for the propagation of modulation energy superimposed on the same carrier field but varying in phase as a function of the azimuth angle. This superimposed field is produced by radiators 9 and 10 arranged in quadrature adjacent radiator 4 and fed with quarter-phase double sideband modulation energy from the balanced modulators 5 and 6, carrier energy being suppressed therein.

Modulator 2 is supplied with modulation energy from the single phase source 8 at, for example, 100 cycles per second. Balanced modulators 5 and 6 are supplied with modulation energy from separate phases of the two phase source 7 at twice the frequency of source 8, or 200 cycles per second. It will be readily understood that the number of phases in the source of modulation energy at 7 determines the number of radiators to be provided in the antenna system. The two-phase source shown at 7 results in two phase, two pole sideband energy applied to the four radiators 9, 9, 10, 10, as shown more fully in the schematic diagram of the transmitter in Fig. 5. The number of phases may be changed, therefore, without altering the mode of operation of the system or departing from the spirit of my invention. A single phase source of modulation at 7 is not sufficient, as at least two phase energy from a balanced source is required to produce a rotating field of energy in space; three phase, two pole energy would be readily adaptable to the system of my invention.

That the phase of the 200 cycle sideband energy is a function of the azimuth angle is more fully shown in my copending application, supra, by analysis of the field intensities at various points equi-distant from the station, unilaterally and at the same instant. Fig. 2 herein represents at 12 the sideband energy radiated from antennas 9 and 10, and indicates by dotted lines 14 across the figure the cycle of phase variation through various directional lines, the letters "N," "NE," "E," etc., referring to compass points about the antenna system 4, 9, 10. At the same time, Fig. 2 indicates the constant phase condition of the wave 15 radiated from antenna 4. It will be remembered that the composite field is that of a radio frequency amplitude modulated wave, shown diagrammatically at the top of Fig. 4, and the wave forms 12 and 15 shown in Fig. 2 are indicative merely of phase relations in component waves. The space field in toto comprises a carrier, double sidebands at 100 cycle modulation, and double sidebands at 200 cycle modulation, the phase of the last being functional upon the azimuth angle.

It is imperative that the original phase relation of the modulation sources 7 and 8 be maintained fixed at the transmitter in order that the phase difference therebetween at the receiver may be interpreted in terms of directional data. Any suitable means may be employed for this purpose, and by way of example I have shown alternator sources at 7 and 8 driven by a motor 11 through a common shaft, the component parts of the assembly being maintained in fixed operative relation.

Referring to Fig. 3 and the receiving system represented in block diagram therein, the radio receiver 17, connected with conventional non-directional antenna 16, is of the usual type for receiving and demodulating amplitude modulated waves. The output thereof includes therefore the 100 cycle and the 200 cycle modulations as audio frequencies. The 100 cycle wave is such as may have been received anywhere within the range of the beacon station, but the 200 cycle wave has a phase characteristic depending upon the directional position of the receiver with respect to the transmitter. The 200 cycle wave is therefore preserved, amplified at 22 and at 24 after being filtered at 23. The 100 cycle wave is preserved in phase but doubled in frequency in the steps through amplifier 18, filter 19, frequency doubler 20 and amplifier 21. Both waves at 200 cycles are fed to a synchroscope 25 wherein the phase relation of the waves causes movement of the pointer $a$ adjusted with respect to a compass type dial for indicating the direction of the transmitter.

Fig. 4, as noted thereon, shows by theoretical wave diagrams the progressive derivation of the north direction actuating signal components for the synchroscope 25 in the receiving system of Fig. 3. The envelope of the radio frequency wave in the first diagram is the result of combination of the 100 cycle and 200 cycle modulations as they are effective in space. Receiver 17 is fed, therefore, an amplitude modulated carrier wave which upon demodulation yields a wave such as that in the second diagram, Fig. 4. This wave, as indicated has a 200 cycle beacon component of undetermined phase (third diagram) and a 100 cycle reference component, of determined phase, the frequency of which is doubled in the frequency doubler 20 (fourth diagram). The last diagram in Fig. 4 represents the beacon and reference components, now both at 200 cycles, as applied to the synchroscope 25; for the north direction considered, the waves are shown to be in synchronism, or with zero phase displacement.

Referring to Fig. 5, the phase relations of the 200 cycle waves in synchroscope 25 are shown, with 90° displacement indicative of the east direction, 180° of the south, and 270° of the west, the reference wave shown by dash remaining of constant phase throughout the azimuth range.

Fig. 6 shows in a general way the indications afforded by the system of my invention at various positions in the field. Two beacon stations are shown cooperating to afford directional data by which the pilot can fix his exact location. Considering station A and pointer $a$ as comprising a simple system for directional indications only as hereinbefore particularly described, it will be noted that on a course 26 pointer $a$ will designate the direction to station A if the pointer is set clockwise from the north position N on the instrument an angle of 180° plus the azimuth angle 26' at station A, between north and course 26. By adjusting pointer $a$ at the angle 26' the instrument of course shows the direction of the receiver from the station A. It will be noted also that the angle $a'$ is constant at all positions along course 26, and varies as this course is lost, as by movement to course 27 or course 28.

By use only of station A and the single indicator $a$, the pilot must rely on other means to determine in which direction along the course he is traveling, and his absolute position with respect to ground. For blind flying, a second azimuth radio beacon station B and receiving means controlling a second pointer $b$, similar in all respects to station A and pointer $a$, may be employed. Pointers $a$ and $b$, suitably identified, may be mounted coaxially for indication on the same compass type dial, if desired, for facility of observation and conservation of space.

Referring to course 26, in Fig. 6, the pilot is enabled, by observation of pointer $b$ and knowing the relative locations of stations A and B from the combined indications of $a$ and $b$, to determine whether he is approaching or retreating from station A. Other indications afforded by the dual indicators are shown on course 28 which runs through both stations A and B, as, for example, where these stations are terminii of a certain route. Arrival indication is afforded by reversal of the coacting pointer, as at $b$ on course 28 on opposite sides of station B.

In the wiring diagram of the transmitter shown in Fig. 7, the portions of the circuit enclosed by dotted lines represent the corresponding elements of Fig. 1. In the oscillator-amplifier element 1, $V_1$ is a crystal oscillator tube and $V_2$ is a radio frequency amplifier tube. $A_1$ and $A_2$ represent the filament sources of $V_1$ and $V_2$ respectively. $B_1$ is the plate current source of $V_1$ and $B_2$ that of $V_2$. $E_1$ is a source of negative D. C. grid bias for $V_2$, and $B_3$ is a source of positive screen potential. Condensers $C_1$ to $C_5$ are D. C. blocking condensers. $H_1$, $H_2$ and $H_3$ are radio frequency choke coils, $R_1$ the grid bias resistor for $V_1$, and K is a piezo-electric crystal for determining the frequency of oscillation. The tuned circuit consisting of condenser $C_6$ and coil $L_1$ supplies carrier frequency excitation from the oscillator circuit to the grid of the amplifier circuit through blocking condenser $C_3$. The amplifier tuned circuit consisting of the condenser $C_7$ and the coil $L_2$ supplies radio frequency excitation to the carrier amplifier 2 and the balanced modulators 5 and 6.

In amplifier 2, $V_3$ is a power amplifier tube of sufficient power to amplify the carrier energy to the level required in antenna 4. $A_3$ indicates the filament source for tube $V_3$, and $E_2$ its grid bias source. Plate voltage for tube $V_3$ is obtained from the D. C. generator source $G_1$ and the 100 cycle A. C. source 8 through transformer $T_3$. The magnitude of the voltage across transformer $T_3$ is arranged so that approximately 50% modulation of the output of tube $V_3$ is obtained. Condensers $C_8$ and $C_9$ are blocking condensers. $H_4$ and $H_5$ are radio frequency choke coils. Condenser $C_{10}$ is a neutralizing condenser for neutralizing the feed back from the plate to the grid circuit of the tube $V_3$. Condensers $C_{11}$, $C_{12}$, and coil $L_3$ constitute the output circuit of tube $V_3$ and serve to match the radio frequency load impedance of the tube to the input impedance of the phase adjusting network 3, which consists of the inductance $L_4$ and the condenser $C_{13}$. The bias voltage, radio frequency excitation voltage, plate voltage and load impedance of tube $V_3$ are adjusted so as to permit linear high level modulation of its output. In the phase adjusting network 3, the coil $L_4$ and condenser $C_{13}$ are adjusted so that the total radio frequency phase shift between the grid voltage of tube $V_3$ and the antenna current in antenna 4 differs by 90 electrical degrees from the total phase shift between the grid voltage of the balanced modulators 5 and 6 and the antennas 9 and 10. The output of phase adjusting network 3 is fed to a transmission line 29 and to the coupling network consisting of condensers $C_{14}$ and $C_{15}$ and coils $L_5$ and $L_6$, and thence to antenna 4.

A portion of the output of oscillator-amplifier 1 is fed to the grids of balanced modulators 5 and 6. In modulator 5, $C_{16}$ to $C_{19}$ are D. C. blocking condensers; $H_6$ to $H_9$ are radio frequency choke coils; $R_2$ and $R_3$ are grid bias resistors; $A_4$ a source of filament power; and $T_1$ is a coupling transformer connected with one phase of the source 7 of 200 cycle alternating current, used to produce modulation of the suppressed carrier type in the modulator. The output circuit consists of the condensers $C_{20}$ and $C_{21}$ and the coil $L_7$ which matches the impedance of the transmission line 30 to that of the modulator. The output of modulator 5 is fed through the transmission line 30 to the coupling network consisting of the resonant circuit $C_{22}$ and $L_8$. The secondary of the antenna coupling network consists of condensers $C_{23}$ and $C_{24}$ and the inductance $L_9$. This secondary circuit feeds the antenna pair 9.

In modulator 6, $C_{25}$, $C_{26}$, $C_{27}$ and $C_{28}$ are blocking condensers. $H_{10}$, $H_{11}$, $H_{12}$ and $H_{13}$ are radio frequency choke coils. $R_4$ and $R_5$ are grid bias resistors. $A_5$ is a source of filament power for vacuum tubes $V_6$ and $V_7$. $T_2$ is a transformer connected with the second phase of the source 7 of 200 cycle alternating current, which is 90° out of phase with the 200 cycle energy applied to modulator 5. This 200 cycle alternating current produces modulation of the suppressed carrier type in modulator 6. The output of tubes $V_6$ and $V_7$ is fed into the antennas 10 in a manner similar to the output of the tubes $V_4$ and $V_5$ of modulator 5. Coil $L_{10}$ and condensers $C_{29}$, $C_{30}$, form the impedance matching circuit leading to transmission line 31. Condensers $C_{31}$, $C_{32}$, $C_{33}$, and coils $L_{11}$ and $L_{12}$ for the coupling circuit leading directly to antennas 10.

The modulation sources 7 and 8 consist of two separate alternators, preferably mechanically coupled on the same shaft, so as to preserve their original phase relation at all times. The alternators may be driven by a prime mover, which may be a gas engine, steam engine or electric motor at 11. Alternator 7 is so constructed as to supply 200 cycle, two-phase alternating current for modulators 5 and 6. Alternator 8 supplies 100 cycle single-phase alternating current and is so constructed that its second harmonic output is zero. In the diagram, Fig. 7, the field excitation circuits for these alternators are shown energized from generator $G_2$. Both alternators are, preferably, of the rotating field type of construction.

The receiving system is shown in detail in Fig. 8, which is a circuit diagram of the audio frequency portion of the receiver. The output of the linear detector is fed into the transformer $T_3$, which supplies the complex audio frequency voltage to the grids of vacuum tubes $V_8$ and $V_{12}$. Bias for these tubes is obtained from the generator source $G_3$ and filament power for all of the tubes is obtained from the source $A_6$. The plate circuit of tube $V_7$ consists of the tuned transformer, made up of the primary coil $L_{13}$ and secondary coil $L_{14}$. Plate power is obtained from the source $B_3$. The secondary coil $L_{14}$ has a mid-point connection into which the bias voltage supplied by source $G_4$ is fed. This secondary coil is tuned to resonance at a frequency of 100 cycles by condenser $C_{34}$, and the resulting balanced voltage obtained is fed into the grids of tubes $V_9$ and $V_{10}$. The plate circuits of these vacuum tubes are arranged to be in parallel, and the plate and bias voltages so adjusted as to result in frequency doubling in the 200 cycle tuned circuit, consisting of the coil $L_{15}$ and the condenser $C_{35}$. Plate voltage for this stage is obtained from the source $B_4$. Because of the push-pull arrangement of the input circuit to this stage, no 100 cycle voltage appears across the output circuit on this stage. Further, any of the residual 200 cycle voltage appearing across the input circuit, $L_{14}$, $C_{34}$, is balanced out so that no portion of it is amplified and fed into the output circuit of the stage. In other words, all of the 200 cycle voltage appearing in the output, comes about as a result of the doubling of the original 100 cycle voltage. The 200 cycle voltage in the output of the stage, consisting of tubes $V_9$ and $V_{10}$, is fed to the grid of tube $V_{11}$ through the blocking condenser $C_{36}$. Bias for the tube $V_{11}$ is obtained from the source $G_5$ through the resistance $R_6$. The plate circuit of tube $V_{11}$ consists of source $B_5$ and transformer $T_4$. The secondary of transformer $T_4$ is connected to the two-phase field structure 32, 33, of the synchroscope 25 through the appropriate phase splitting network, consisting of $C_{37}$, $R_7$, $L_{18}$ and $R_8$.

Returning to the transformer $T_3$, the secondary voltage on this transformer is impressed on the grid of the tube $V_{12}$, and the plate circuit of this tube consists of the source $B_6$ and the primary of the tuned transformer $L_{16}$, $L_{17}$. This transformer is tuned to a frequency of 200 cycles, and as a result no appreciable 100 cycle voltage appears across its terminals. The secondary of the transformer consisting of $L_{17}$ and $C_{38}$, which, as has been stated, is tuned to a frequency of 200 cycles per second, supplies grid voltage to the tube $V_{13}$, and bias is obtained from the source $G_6$. The plate current of $V_{13}$ consists of the source $B_7$ and the transformer $T_5$. This transformer $T_5$ is used to supply 200 cycle voltage to the moving coil circuit 34 of the synchroscope. The synchroscope will accurately indicate the phase difference between the 100 cycle voltage and the 200 cycle voltage by virtue of the fact that the 200 cycle voltage supplying the field has been obtained from only the original 100 cycle source.

While I have described my invention in a preferred embodiment, I desire it understood that modifications may be made and that no limitations upon my invention are intended except as are imposed by the scope of the appended claims. It will be remembered that the directional indication is derived from a comparison of the phases of two modulations, each separately propagated, with a single carrier wave serving both modulations. No synchronism is required to be maintained between transmitter and receiver as all indications are afforded by the modulations received in accordance with preadjusted and calibrated conditions based on azimuth relations as a standard of reference. It is understood that any other reference as a basis for orientation may be provided, and the receiver either preadjusted for direct operation in accordance therewith, or a correction constant be applied by the pilot.

In special applications of the system it may be found advisable to transmit pulse signals rather than continuous modulations for reference purposes, in order to minimize power consumption, or to permit the propagation of meaningless pulse signals intermediate the true reference pulse where the directional signals are to be available only to authorized users whose receiving equipment is preset to select the true reference pulse, as in warcraft. Secrecy in such instances may also be obtained by establishing for reference a line other than north-south, the angular deviation from the north-south standard being known only to authorized users and applied by them as a correction constant. These and other modifications are contemplated within the scope of the following claims.

What I claim as new and desire to secure by Letters Patent of the United States is as follows:

1. In a radio beacon system, a source of carrier current, means for propagating in space an amplitude modulated composite wave comprising the carrier component and sideband components of constant azimuthal phase and a certain modulation frequency, means for propagating in space a suppressed carrier wave comprising sideband components of twice said modulation frequency and phase varying with the angle of propagation measured in the ground plane with respect to a given phase reference, the carrier frequency being the same in both said waves, means for receiving and demodulating both said composite wave and said suppressed carrier wave, means for separating said sideband modulation components, means for doubling the frequency of the modulation component of constant phase, both said modulation frequencies thereby being the same, and a synchroscope for comparing the phases of said modulation components of like frequency to determine direction with respect to said given reference.

2. In a radio beacon system in combination, a broadcast transmitter for propagating in space an amplitude modulated carrier wave including a modulation component of constant azimuthal phase and a suppressed carrier wave including a modulation component of directionally variable phase, said components being of different modulation frequencies; and a receiver including means for mixing said modulated and suppressed carrier waves, means for separating said modulation components of different frequency, means for increasing the frequency of one modulation component to equal the frequency of the other modulation component, and means for directly comparing the phases of the modulation components of equal frequency for determining direction with respect to a reference established by said modulation component of constant phase.

3. In a radio beacon system, a transmitter comprising a source of carrier energy, a single phase source of modulation energy, a split-phase source of modulation energy of twice the frequency of said single phase source, means for maintaining the phase relation of said sources of modulation energy constant at said transmitter, modulating means for combining carrier and single phase modulation energy, and balanced modulating means for combining carrier energy separately with each phase of the split-phase modulation energy, the carrier being suppressed in each of said balanced modulating means, an antenna connected with the first said modulating means for broadcasting modulated carrier energy, and antenna means connected with said balanced modulating means and disposed in predetermined relation to the aforesaid antenna for establishing a rotating field of modulated suppressed carrier energy, the phase of the modulation in said rotating field being a function of direction of the field with respect to a reference established by the modulation in said broadcast energy; a receiver having means for doubling the frequency of the modulation from said single phase source to equal the frequency of the other modulation, and means for measuring the phase relation of said modulations at equal frequency.

4. The method of determining direction by radio frequency energy which consists in maintaining in fixed phase relation at the transmitter a reference modulation of a certain frequency and a beacon modulation of twice the frequency of said reference modulation, varying the space phase of the beacon modulation as a function of the azimuth angle at the transmitter while maintaining the reference modulation in constant azimuthal phase, detecting said modulations at a point in the radiation field, separating said modulations, doubling the frequency of the reference modulation for equalizing the frequencies of said modulations for phase comparison purposes, measuring the phase displacement of the beacon modulation with respect to the phase of the reference modulation, and determining the direction of the transmitter from such measurement.

5. In a radio direction finding system wherein the space phase relation of component modulations of the same radio frequency carrier current is indicative of direction, separate sources of modulation energy of different frequencies, means for maintaining a fixed phase relation between said modulations at said sources, selective means at the receiver for separating said modulations by virtue of said different frequencies, and means for equalizing said frequencies at the receiver for phase comparison purposes.

6. In a radio direction finding system wherein the space phase relation of component modulations of the same radio frequency carrier current is indicative of direction, electromechanical alternators constituting separate sources of modulation energy of different frequencies, common drive means for said alternators for maintaining a fixed phase relation between said modulations at the sources thereof, selective means at the receiver for separating said modulations by virtue of said different frequencies, and means for equalizing said frequencies at the receiver for phase comparison purposes.

7. In a direction finding system wherein the space phase relation of component modulations of the same radio frequency carrier current is indicative of direction, separate electromechanical means for producing modulation energy of different frequencies, common drive means for said electromechanical means for maintaining a fixed phase relation between said modulations at the sources thereof, said electromechanical means being individually so constructed and related to said common drive means that the frequency of one of said modulations is twice that of the other, selective means at the receiver for separating said modulations by virtue of said different frequencies, and frequency doubling means operative with respect to the modulation of lower frequency for equalizing the frequencies of said modulations for phase comparison purposes.

JOHN F. BYRNE.